United States Patent
Ishikawa et al.

(10) Patent No.: US 9,438,141 B2
(45) Date of Patent: Sep. 6, 2016

(54) BRAKING APPARATUS FOR ELECTRIC POWER TOOL

(71) Applicant: MAKITA CORPORATION, Anjo-shi, Aichi (JP)

(72) Inventors: Goshi Ishikawa, Anjo (JP); Itsuku Kato, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 126 days.

(21) Appl. No.: 14/540,707

(22) Filed: Nov. 13, 2014

(65) Prior Publication Data
US 2015/0137717 A1    May 21, 2015

(30) Foreign Application Priority Data
Nov. 18, 2013    (JP) ................... 2013-237852

(51) Int. Cl.
*H02P 3/12*    (2006.01)
*B25F 5/00*    (2006.01)

(52) U.S. Cl.
CPC .. *H02P 3/12* (2013.01); *B25F 5/00* (2013.01)

(58) Field of Classification Search
CPC ............... H02P 3/00; H02P 3/12; H02P 3/22
USPC ........................................ 318/375, 379, 380
See application file for complete search history.

(56) References Cited

U.S. PATENT DOCUMENTS

| | | | |
|---|---|---|---|
| 5,083,067 A | 1/1992 | Soushin et al. | |
| 8,159,847 B2 * | 4/2012 | Viitanen | H02P 3/22 363/37 |
| 8,466,641 B2 * | 6/2013 | Kaufmann | B25F 5/001 173/176 |
| 9,007,003 B2 * | 4/2015 | Kim | H02M 1/32 318/371 |
| 2003/0052632 A1 | 3/2003 | Wissmach et al. | |
| 2011/0309779 A1 | 12/2011 | Hiti et al. | |
| 2012/0019177 A1 | 1/2012 | Kaufmann et al. | |

FOREIGN PATENT DOCUMENTS

| | | |
|---|---|---|
| DE | 101 34 454 A1 | 2/2003 |
| DE | 10 2010 032 335 A1 | 1/2012 |
| DE | 10 2011 075 487 A1 | 3/2012 |
| DE | 10 2011 102 275 A1 | 11/2012 |
| DE | 10 2011 107 233 A1 | 1/2013 |
| JP | A-3-74194 | 3/1991 |

OTHER PUBLICATIONS

Feb. 23, 2015 Office Action issued in German Patent Application No. 10 2014 016 822.0.

* cited by examiner

*Primary Examiner* — Bentsu Ro
(74) *Attorney, Agent, or Firm* — Oliff PLC (57) ABSTRACT

One aspect of an embodiment of the present disclosure is a braking apparatus for an electric power tool that includes a switching circuit with six switching elements and a brake control unit. The brake control unit switches any one selected switching element of three switching elements forming one selected switch group of a high-side switch group and a low-side switch group to an off state from an on state at a timing at which braking current flows through a diode connected in parallel to the selected switching element upon turn-off of the selected switching element.

16 Claims, 8 Drawing Sheets

BRAKING APPARATUS FOR ELECTRIC POWER TOOL

CROSS-REFERENCE TO RELATED APPLICATIONS

This application claims the benefit of Japanese Patent Application No. 2013-237852 filed Nov. 18, 2013 in the Japan Patent Office, the disclosure of which is incorporated herein by reference.

BACKGROUND

The present invention relates to a braking apparatus for an electric power tool, which generates braking force in a three-phase brushless motor by causing a short circuit between terminals of the three-phase brushless motor.

For example, in an electric power tool disclosed in Japanese Unexamined Patent Application Publication No. 3-74194, in order to decelerate or stop rotation of a three-phase brushless motor, a so-called short-circuit brake is used, which generates braking force by causing a short circuit between terminals of the motor.

In the short-circuit brake, for example, a set of three switching elements (so-called low-side switches) provided in a current path between each terminal of the motor and a negative electrode of a direct current power source are turned on, and another set of three switching elements (so-called high-side switches) provided in a current path between the each terminal of the motor and a positive electrode of the direct current power source are turned off, thereby causing the motor to generate braking force.

In this manner, in the short-circuit brake, it is possible to brake (decelerate or stop) the motor by merely turning on/off of the switching elements used in the current control of the motor.

SUMMARY

In the above-described short-circuit brake, however, braking force is generated by flowing braking current to all phases of the motor, and therefore, the braking force becomes excessively large, generating a large force applied to an electrical equipment due to this excessive braking force. As a result, defects may occur in the electrical equipment.

For example, in an electric power tool, when rotation of a motor is stopped by using the short-circuit brake, an excessively large braking force may be generated. Due to this excessively large braking force, a strong reaction force may be generated in the electric power tool, thereby deteriorating feeling of use of the electric power tool by a user or loosening screws or nuts that are used to mount tool bits.

According to one aspect of an embodiment in the present disclosure, it is desirable to provide a braking apparatus with which braking force generated by a short-circuit brake is appropriately set so as to be able to inhibit occurrence of failures in an electric power tool due to excess or shortage of braking force.

One aspect of an embodiment in the present disclosure is a braking apparatus for an electric power tool that causes a three-phase brushless motor provided in the electric power tool and having three terminals to generate a braking force. The braking apparatus comprises a switching circuit and a brake control unit. The switching circuit comprises six switching elements. The six switching elements comprises a first set of three switching elements forming a high-side switch group provided on a positive side current conduction path that connects the three terminals with a positive electrode side of a direct current power source so as to connect or disconnect the positive side current conduction path. The six switching elements comprises a second set of three switching elements forming a low-side switch group provided on a negative side current conduction path that connects the three terminals with a negative electrode side of the direct current power source so as to connect or disconnect the negative side current conduction path. Each of the six switching elements comprises a diode connected in parallel thereto. The brake control unit is configured such that during rotation of the three-phase brushless motor, upon receiving an input of one of a stop command and a deceleration command of the electric power tool, the brake control unit controls an on/off state of the three switching elements of the high-side switch group and an on/off state of the three switching elements of the low-side switch group to cause a braking current to flow to the three-phase brushless motor, thereby generating the braking force. The brake control unit is further configured to switch any one selected switching element of the three switching elements forming one selected switch group of the high-side switch group and the low-side switch group to the off state from the on state at a timing at which the braking current flows through the diode connected in parallel to the selected switching element upon turn-off of the selected switching element.

That is to say, in the braking apparatus, the braking current flowing to the three-phase brushless motor is controlled, not by performing a three-phase short circuit control, which causes electric current to flow through all of three switching elements provided in either the positive side current conduction path or the negative side current conduction path to the three-phase brushless motor, but by switching the on/off state of the three switching elements provided in either the positive side current conduction path or the negative side current conduction path.

Therefore, the present braking apparatus can suppress flow of braking current to the three-phase brushless motor and reduce braking force generated in the three-phase brushless motor.

Moreover, since the braking force can be controlled by the braking current flowing to the three-phase brushless motor, the present braking apparatus can adjust a switching timing of the on/off state of each of the switching elements to set desired deceleration characteristics at the time of stopping or decelerating the electric power tool.

In addition, in the present braking apparatus, if the selected switching element is turned off, braking current flows through the diode connected in parallel to the selected switching element. For this reason, it is possible to inhibit the following problem: when electric current flowing to windings (coils) of the three-phase brushless motor is cut off, a high voltage is generated in the coils; due to such a high voltage, regeneration current flows in the direct current power source.

That is, in the present braking apparatus, the turn-off timing of the selected switching element when a brake is applied to the electric power tool (and therefore, the three-phase brushless motor) is set in the above-described manner. For this reason, it is possible to inhibit generation of a high voltage when the selected switching element is turned off and flow of regeneration current in the direct current power source, and therefore, to inhibit deterioration of the other switching elements due to flow of the regeneration current.

Furthermore, in the present braking apparatus, the turn-off timing of the selected switching element may be set by detecting a flow direction of electric current flowing to the three-phase brushless motor through the selected switching element. Therefore, there is no need to use a highly-accurate rotation position sensor, and the braking apparatus capable of inhibiting flow of regeneration current can be realized at low cost.

Also, in the present braking apparatus, adjustment of the turn-off timing of the selected switching element makes it possible to inhibit flow of regeneration current and temperature increase in the diode (and therefore, the selected switching element).

The selected switch group may be the low-side switch group. In this case, the brake control unit may switch the selected switching element from the on state to the off state when the braking current is flowing to the three-phase brushless motor from the low-side switch group.

When the brake control unit turns off the selected switching element in the low-side switch group in the aforementioned manner, braking current flows through the diode provided in parallel to the selected switching element. Consequently, it is possible to inhibit generation of a high voltage when the selected switching element is turned off, and flow of regeneration current to the direct current power source through the high-side switch group.

The selected switch group may be the high-side switch group. In this case, the brake control unit may switch the selected switching element from the on state to the off state when the braking current is flowing to the high-side switch group from the three-phase brushless motor.

When the brake control unit turns off the selected switching element in the high-side switch group in the aforementioned manner, braking current flows through the diode provided in parallel to the selected switching element. Consequently, it is possible to inhibit generation of a high voltage when the selected switching element is turned off, and flow of regeneration current to the direct current power source through the other switching elements in the high-side switch group.

The brake control unit may switch the selected switching element from the on state to the off state when the braking current flowing to the selected switching element decreases. In this case, heat generation of the diode can be reduced by shortening a period during which electric current is flowing through the diode.

The braking apparatus may further comprise a rotational position detection unit that is configured to detect a rotational position of the three-phase brushless motor at every given angle of rotation of the three-phase brushless motor. In this case, the brake control unit may switch the selected switching element from the on state to the off state based on the rotational position detected by the rotational position detection unit.

With this configuration, in order to switch the selected switching element to the off state from the on state, it is not necessary to separately provide a detection element for detection of a flow direction of electric current when the selected switching element is on. This makes it possible to provide the braking apparatus at low cost.

Moreover, the brake control unit may switch the selected switching element from the on state to the off state, after an elapse of a given time period subsequent to detection of a specified rotational position by the rotational position detection unit.

In this case, the turn-off timing of the selected switching element by the brake control unit can be easily set by using, as a reference, a detection signal from the rotational position detection unit; thus, design of the braking apparatus can be easily made.

Furthermore, the brake control unit may switch the selected switching element from the on state to the off state based on a drive condition of the three-phase brushless motor.

In this case, the turn-off timing of the selected switching element by the brake control unit can be changed depending on the drive condition of the three-phase brushless motor, thereby allowing an optimal control of electric current flowing to the diode (and therefore, amount of heat generation of the diode) after the selected switching element has been turned off.

For example, if a revolution (rotation speed) of the motor is high, the amount of electric current flowing to the diode when the selected switching element is turned off is large. In such a case, the turn-off timing of the selected switching element is delayed to reduce the amount of electric current flowing to the diode, thereby suppressing heat generation of the diode.

More specifically, the brake control unit may detect, as the drive condition of the three-phase brushless motor, at least one of a revolution of the three-phase brushless motor, a temperature of the three-phase brushless motor, a voltage of the direct current power source, and an operated amount of an operation unit that instructs driving of the electric power tool; and the brake control unit may switch the selected switching element from the on state to the off state based on the drive condition detected.

The brake control unit may switch the selected switching element from the off state to the on state based on the rotational position detected by the rotational position detection unit.

In this case, based on the rotational position detected by the rotational position detection unit, the brake control unit sets, not only the turn-off timing of the selected switching element, but also a turn-on timing of the selected switching element.

That is, when the brake control unit turns on the selected switching element, a period during which the braking current flows to the three-phase brushless motor (in other words, braking force that is generated depending on an amount of electric current flowing during the period) can be set based on the rotational position detected by the rotational position detection unit.

The brake control unit may switch the selected switching element from the off state to the on state, after an elapse of a given time period subsequent to detection of a specified rotational position by the rotational position detection unit.

In this case, the turn-on timing of the selected switching element by the brake control unit can be set easily by using, as a reference, a detection signal from the rotational position detection unit; thus, design of the braking apparatus can be easily made.

Still further, the brake control unit may switch the selected switching element from the off state to the on state based on a drive condition of the three-phase brushless motor.

In this case, the turn-on timing of the selected switching element by the brake control unit can be changed depending on the drive condition of the three-phase brushless motor. Therefore, an optimal control of braking current flowing to the three-phase brushless motor (and therefore, braking force) can be achieved.

For example, when a revolution (rotation speed) of the motor is high, larger braking current (and therefore, braking force) than braking current when the rotation speed is low is generated. In this case, the turn-on timing of the selected switching element is delayed so as to reduce the braking current (and therefore, braking force) during such a delayed time, thereby reducing reaction of the braking force.

More specifically, the brake control unit may detect, as the drive condition of the three-phase brushless motor, at least one of a revolution of the three-phase brushless motor, a temperature of the three-phase brushless motor, a voltage of the direct current power source, and an operated amount of an operation unit that instructs driving of the electric power tool, and the brake control unit may switch the selected switching element from the off state to the on state based on the drive condition detected.

The brake control unit may simultaneously make the three switching elements of the selected switch group be in off state for at least a given period of time.

In this case, since the brake control unit simultaneously turns off the three switching elements, a period during which no braking current flows to the three-phase brushless motor is set. This can further reduce the braking force generated in the three-phase brushless motor.

Moreover, the brake control unit may alternately perform a current conduction control and a current non-conduction control. In the current conduction control, any two elements of the three switching elements of the selected switch group are selectively made to be in on state to cause the braking current to flow to the three-phase brushless motor. In the current non-conduction control, the three switching elements of the selected switch group are simultaneously made to be in off state.

In this case, the braking current intermittently flows to the three-phase brushless motor; by adjusting the performing ratio of the current conduction control and the current non-conduction control in this intermittent control, it is possible to expand an adjustable range of the braking force generated in the three-phase brushless motor.

Furthermore, the brake control unit may simultaneously make the three switching elements of the selected switch group be in on state for at least a given period of time.

In this case, since the brake control unit simultaneously turns on the three switching elements of the selected switch group, it is possible to set a time period during which a maximum braking force is generated in the three-phase brushless motor. By adjusting this time period, the braking force generated in the three-phase brushless motor can be adjusted.

Still further, the brake control unit may alternately use the high-side switch group and the low-side switch group as the selected switch group.

In this case, the high-side switch group and the low-side switch group can be alternately used as the selected switch group, through which the braking current flows at the time of braking the three-phase brushless motor; consequently, an amount of electric current flowing to a single diode is reduced, thereby further reducing heat generation of the diode.

BRIEF DESCRIPTION OF THE DRAWINGS

The present invention will now be described by way of example with reference to the accompanying drawings, in which.

DETAILED DESCRIPTION OF THE PREFERRED EMBODIMENTS

Figure 1:
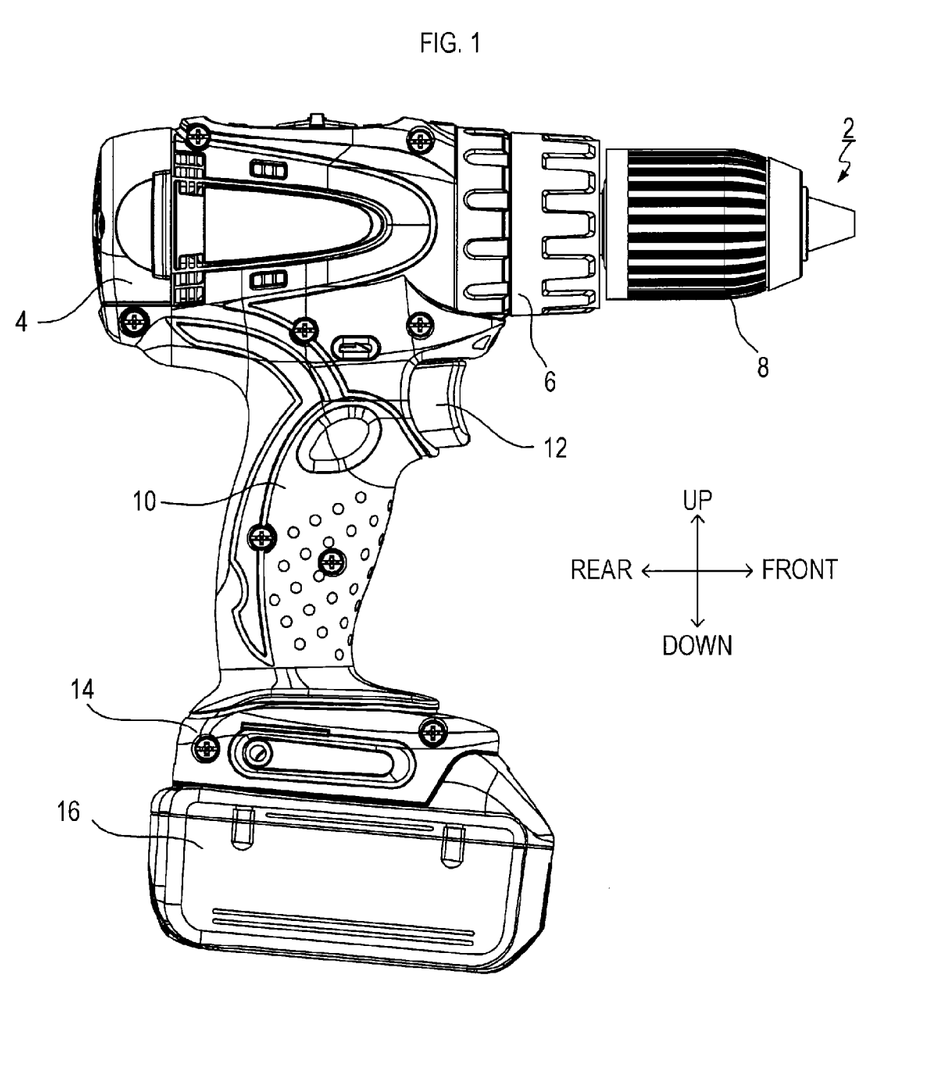
FIG. 1 is an explanatory view showing an overall configuration of an electric power tool of an exemplary embodiment.

As shown in FIG. 1, an electric power tool 2 of the present exemplary embodiment is configured to be a so-called driver drill. The electric power tool 2 is provided with: a motor housing 4; a gear housing 6 located forward of the motor housing 4; a drill chuck 8 located forward of the gear housing 6; and a hand grip 10 located downward of the motor housing 4.

The motor housing 4 houses a motor 20 (see FIG. 2) that generates driving force to rotary-drive the drill chuck 8. The motor 20 of the present embodiment is configured to be a three-phase brushless motor.

The gear housing 6 houses a gear mechanism (not shown) that transmits the driving force of the motor 20 to the drill chuck 8.

The drill chuck 8 is provided with an attachment mechanism (not shown) for detachable attachment of a tool bit (not shown) at a front end of the drill chuck 8.

The hand grip 10 is shaped such that a user of the electric power tool 2 can grip the hand grip 10 with a single hand. At an upper front of the hand grip 10, a trigger switch 12 is provided, which is used to drive or stop the motor 20 by the user of the electric power tool 2.

At a lower end of the hand grip 10, a battery pack attachment portion 14 is provided to detachably attach a battery pack 16. The battery pack attachment portion 14 is configured such that when the user slides the battery pack 16 in a forward direction of the electric power tool 2, the battery pack 16 can be detached from the battery pack attachment portion 14.

The battery pack 16 is configured to supply a direct current power to the electric power tool 2. More specifically, the battery pack 16 of the present embodiment includes therein a rechargeable battery having a lithium-ion rechargeable battery, etc.

When the battery pack 16 is attached to the battery pack attachment portion 14 so as to be electrically connected to a motor drive device 30 (see FIG. 2) inside the electric power tool 2, the battery pack 16 can supply a direct current power to the electric power tool 2.

The motor drive device 30 is configured to drive the motor 20 in accordance with a drive command from the trigger switch 12, and apply a brake to the motor 20 in accordance with a stop command from the trigger switch 12. More specifically, the motor drive device 30 is configured as shown in FIG. 2.

Figure 2:
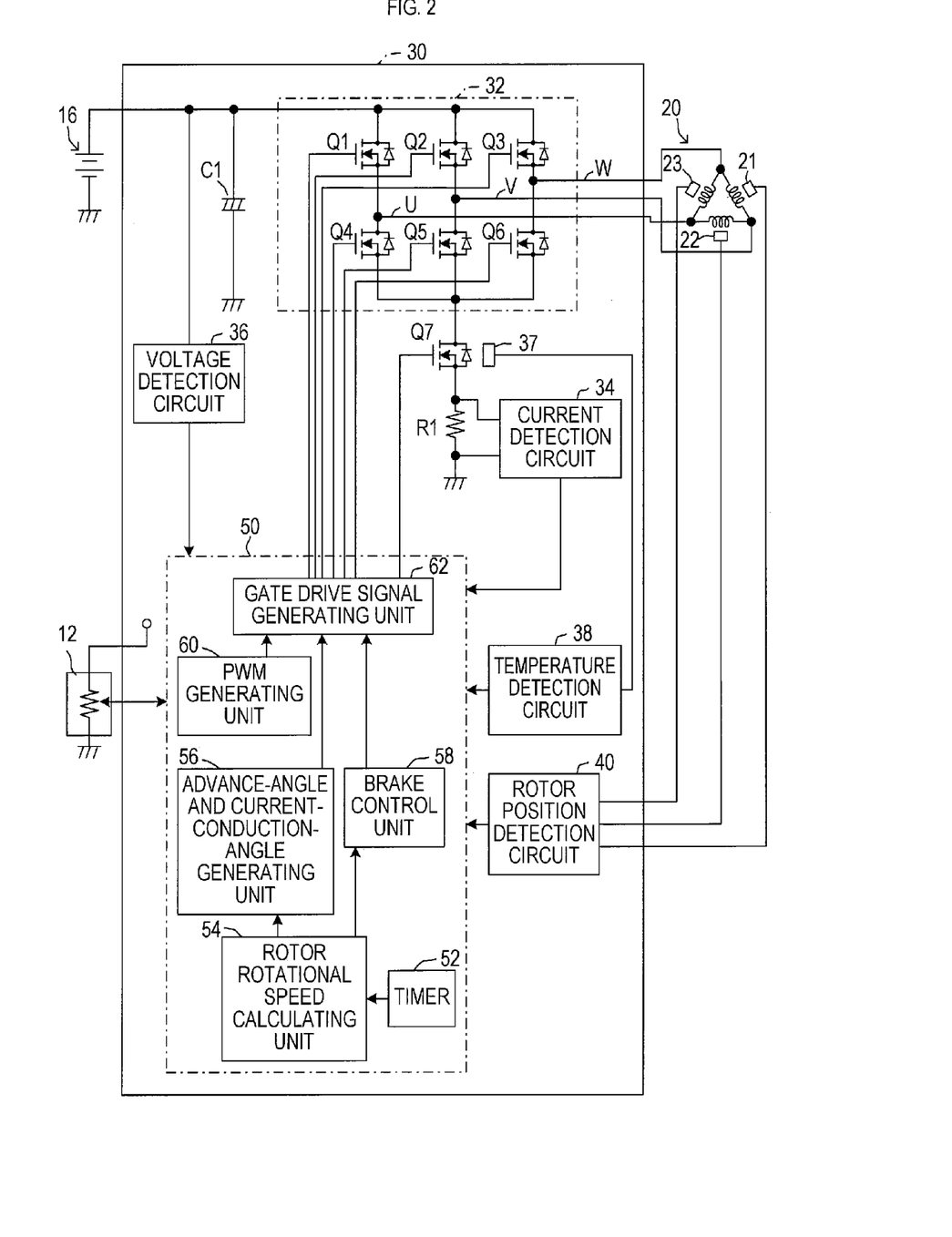
FIG. 2 is a block diagram showing a circuit configuration of a motor drive device provided in the electric power tool.

As shown in FIG. 2, the motor drive device 30 of the present embodiment includes a power supply line and a ground line; the power supply line is connected to a positive electrode side of the battery pack 16, and the ground line is connected to a negative electrode side of the battery pack 16.

Provided between the power supply line and the ground line is a switching circuit 32 for controlling electric current that flows to each of phases U, V, and W of the motor 20. The switching circuit 32 includes six switching elements Q1, Q2, Q3, Q4, Q5, and Q6.

The three switching elements Q1 to Q3 are provided on a positive side current conduction path between respective terminals of the phases U, V, and W of the motor 20, and the power supply line. Hereinafter, the switching elements Q1 to Q3 are also referred to as "high-side switches". The other three switching elements Q4 to Q6 are provided on a negative side current conduction path between respective terminals of the phases U, V, and W of the motor 20, and the ground line. Hereinafter, the switching elements Q4 to Q6 are also referred to as "low-side switches".

The negative side current conduction path between the switching circuit 32 and the ground line (namely, between the low-side switches Q4 to Q6 and the ground line) is provided with a switching element Q7 (current cutoff switch) for cutting off current conduction, and a resistor R1.

A current detection circuit 34 is connected to both ends of the resistor R1, and detects electric current flowing through the motor 20 based on a voltage between the both ends of the resistor R1. A temperature sensor 37, characteristics of which vary with a temperature of the current cutoff switch Q7, is provided in the vicinity of the current cutoff switch Q7.

A temperature detection circuit 38, which detects a temperature of the current cutoff switch Q7 via the temperature sensor 37, is connected to the temperature sensor 37. A detection signal from the temperature detection circuit 38 and a detection signal from the current detection circuit 34 are inputted to a control circuit 50.

In the present embodiment, each of the switching elements Q1 to Q7 is configured as an N-channel MOSFET. Due to this structure, each of the switching elements Q1 to Q7 has a parasitic diode between the drain and source thereof. Each of the parasitic diodes is connected in parallel to the corresponding switching element, such that a forward direction of that parasitic diode is made to be a direction from the source to the drain of the corresponding switching element.

A smoothing capacitor C1 and a voltage detection circuit 36 are provided between the ground line, and the power supply line (the positive side current conduction path) extending from the positive electrode side of the battery pack 16 to the switching circuit 32. The voltage detection circuit 36 detects a voltage (i.e., battery voltage) between the power supply line and the ground line.

The motor drive device 30 further includes a rotor position detection circuit 40 that detects a rotational position of the motor 20. A detection signal from the voltage detection circuit 36 and a detection signal from the rotor position detection circuit 40 are inputted to the control circuit 50.

The rotor position detection circuit 40 detects a rotational position (in other words, rotational angle) of the motor 20 based on respective detection signals (Hall signals) from three Hall sensors 21, 22, and 23. The Hall sensors 21 to 23 are provided in the motor 20 to detect the rotational position.

That is to say, in the present embodiment, the Hall sensors 21 to 23 are disposed at 120-degree intervals around a rotor of the motor 20. The Hall sensors 21 to 23 disposed as described above output, respectively, U phase-, V phase-, and W phase-Hall signals, increasing and decreasing directions of which invert with every 180-degree rotation of the rotor.

The rotor position detection circuit 40 shapes waveforms of the U phase-, V phase-, and W phase-Hall signals outputted from the Hall sensors 21 to 23, and generates respective pulsed Hall signals of the U phase, V phase, and W phase. In the pulsed Hall signals, polarities thereof are inverted between positive and negative with every 180-degree rotation of the rotor (see FIG. 3). Therefore, the rotor position detection circuit 40 detects the rotational position of the motor 20 (specifically, the rotor) in 60-degree intervals from edges of each of the Hall signals.

The control circuit 50 of the present embodiment is provided with a microcomputer (not shown) including a CPU, a ROM, and a RAM. The control circuit 50 performs drive control and brake control of the motor 20 in accordance with an operated amount of the trigger switch 12 operated by a user.

That is to say, when the trigger switch 12 is operated by the user, the control circuit 50 determines that a drive command has been inputted, and drives the motor 20 based on the operated amount of the trigger switch 12. When the user ceases to operate the trigger switch 12, the control circuit 50 determines that a deceleration command or a stop command has been inputted, and applies a brake to the motor 20.

In order to perform the aforementioned drive control and brake control of the motor 20, the control circuit 50 executes various control programs stored in the ROM. By the execution of the various control programs, the control circuit 50 functions as a timer 52 measuring a time, a rotor rotational speed calculating unit 54, an advance-angle and current-conduction-angle generating unit 56, a brake control unit 58, a PWM generating unit 60, and a gate drive signal generating unit 62.

The rotor rotational speed calculating unit 54 calculates a rotation speed of the motor 20 based on a detection signal outputted from the rotor position detection circuit 40 at each specified rotational angle of the motor 20 (in the present embodiment, at each 60-degree rotation), as well as on a measured time measured by the timer 52.

Based on the electric current flowing to the motor 20 detected by the current detection circuit 34, and the rotational position of the motor 20 detected by the rotor position detection circuit 40, the advance-angle and current-conduction-angle generating unit 56 references an advance-angle and current-conduction-angle map stored in advance in the ROM, generates a current conduction command indicating an advance angle and a current conduction angle while the motor 20 is being driven, and outputs the current conduction command to the gate drive signal generating unit 62.

The PWM generating unit 60 calculates a drive duty ratio for PWM control of electric current supplied to the motor 20, generates a PWM command indicating the drive duty ratio, and outputs the PWM command to the gate drive signal generating unit 62.

The gate drive signal generating unit 62 generates a drive signal that turns on the current cutoff switch Q7 when the trigger switch 12 is operated to perform drive control of the motor 20, and then outputs the drive signal to the current cutoff switch Q7.

Moreover, in accordance with the current conduction command from the advance-angle and current-conduction-angle generating unit 56, the gate drive signal generating unit 62 generates a drive signal that turns on one of the high-side switches Q1 to Q3 included in the switching circuit 32, and a drive signal that turns on one of the low-side switches Q4 to Q6 included in the switching circuit 32; the gate drive signal generating unit 62 outputs these drive signals to the switching circuit 32.

In addition, the gate drive signal generating unit 62 sets a drive duty ratio of at least one command of the drive command to one group consisting of the high-side switches Q1 to Q3 and the drive command to the other group consisting of the low-side switches Q4 to Q6, in a variable manner corresponding to the PWM command from the PWM generating unit 60. Consequently, at least one group of the one group of the high-side switches Q1 to Q3 and the other group of the low-side switches Q4 to Q6 is driven in accordance with the duty ratio.

Therefore, when electric current corresponding to the drive duty ratio flows to each of the phases U, V, and W of the motor 20, the motor 20 is caused to rotate at a rotational speed corresponding to the operated amount of the trigger switch 12.

The control circuit 50 monitors the battery voltage and the temperature based on the respective detection signals from the voltage detection circuit 36 and the temperature detection circuit 38. The control circuit 50 ceases the drive control of the motor 20 when the battery voltage is low or the temperature rises.

The brake control unit 58 is a control block that implements a function as a control device (specifically, a brake control unit) in the present disclosure. When the user stops operating the trigger switch 12 during the drive control of the motor 20, the brake control unit 58 assumes that a deceleration command or a stop command has been inputted, and causes the motor 20 to generate braking force.

Specifically, the brake control unit 58 turns off the current cutoff switch Q7 via the gate drive signal generating unit 62. Furthermore, the brake control unit 58 selectively turns on part of the switching elements Q1 to Q6 inside the switching circuit 32 so as to connect between terminals of the motor 20, thereby causing the motor 20 to generate braking force.

As such a short-circuit brake, an all-phase short-circuit brake is known, which turns off the high-side switches Q1 to Q3 and turns on the low-side switches Q4 to Q6.

However, in the all-phase short-circuit brake, electric current (i.e., so-called braking current) flows through each of the phases U, V, and W of the motor 20 depending on rotation of the motor 20, and braking force corresponding to the braking current is generated. Therefore, the braking force may become excessively large depending on rotation conditions (rotational speed, etc.) of the motor 20, causing a failure in the electric power tool 2.

Figure 3:
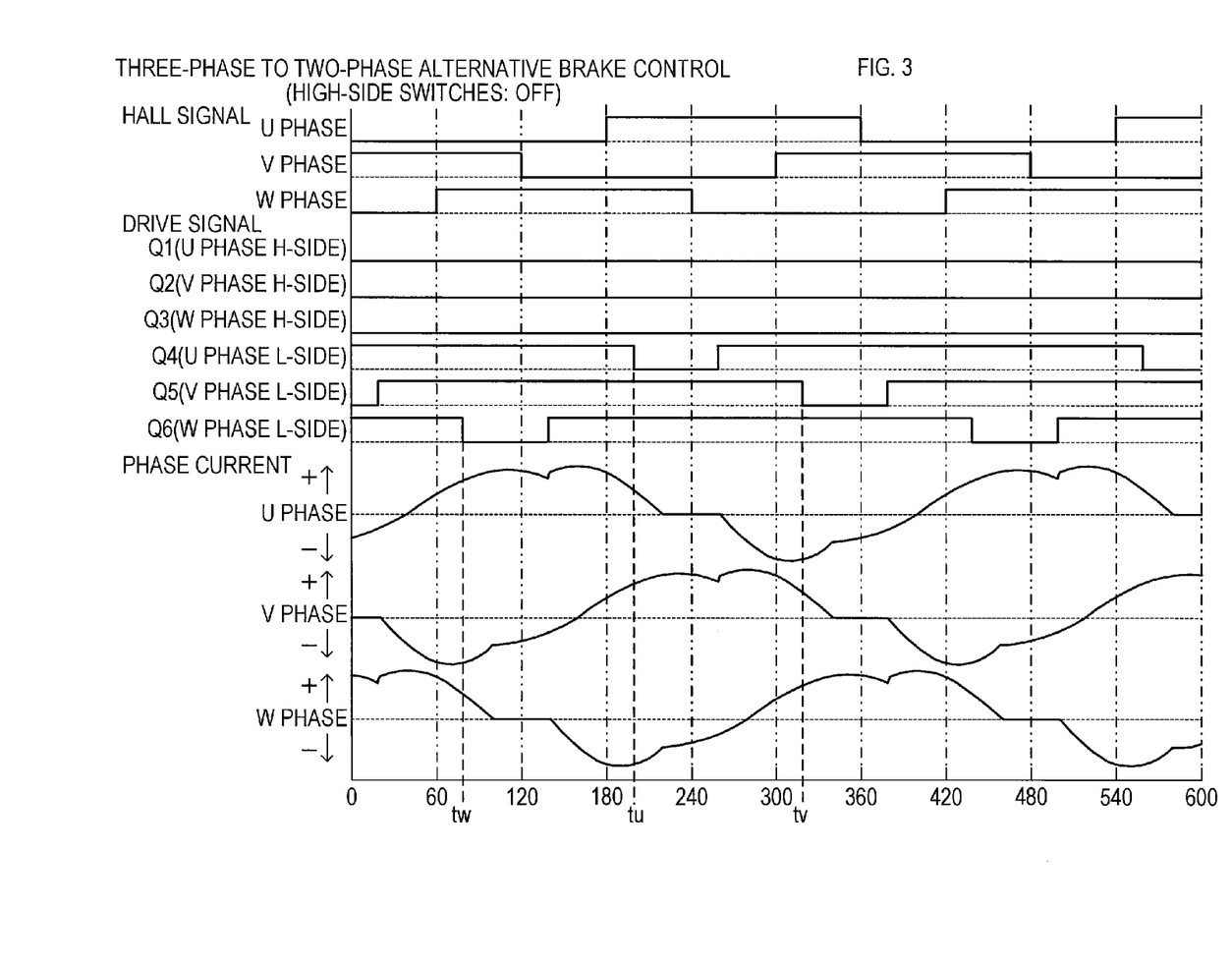
FIG. 3 is an explanatory view showing changes in Hall signals, drive signals, and phase current in a three-phase to two-phase alternative brake control.

Therefore, in the present embodiment, the brake control unit 58 is configured to perform a three-phase to two-phase alternative brake control shown in FIG. 3. to apply a brake to the motor 20 with a desired braking force.

Specifically, in the three-phase to two-phase alternative brake control shown in FIG. 3, the current cutoff switch Q7 and the high-side switches Q1 to Q3 are turned off. The low-side switches Q4 to Q6 are turned on and off in synchronization with a change of the rotational position of the motor 20 detected by the rotor position detection circuit 40, so that a desired motor current is supplied to the motor 20; consequently, a desired braking force is generated in the motor 20.

That is to say, in the present embodiment, the low-side switches Q4 to Q6 are periodically turned off to provide a current interruption period, during which the flow of the braking current is interrupted, and thus, generation of braking force in the motor 20 is suppressed compared to a conventional all-phase short-circuit brake.

In addition, the low-side switches Q4 to Q6 are turned on and off at a specified pattern in each of the phases U, V, and W, in synchronization with the change of the rotational position of the motor 20 detected by the rotor position detection circuit 40.

Moreover, respective timings tu, tv, and tw at which the low-side switches Q4 to Q6 of the phases U, V, and W are turned off from on are set as shown in FIG. 3; specifically, the timings tu, tv, and tw are set within a period during which braking current flows from the low-side switches Q4 to Q6 to the motor 20 in the forward direction and the motor current decreases.

As a result, upon turning the low-side switches Q4 to Q6 of the phases U, V, and W from on to off, the braking current continuously flows through the parasitic diodes of the low-side switches Q4 to Q6. In addition, a period during which the braking current flows to the parasitic diodes is inhibited from becoming longer.

In other words, in the present embodiment, the timings for turning off the low-side switches Q4 to Q6 are set such that even if the low-side switches Q4 to Q6 are turned off, the motor current continuously flows through the parasitic diodes. This can inhibit occurrence of the following problem; that is, when the low-side switches Q4 to Q6 are off, high voltages are generated at the terminals of the motor 20, which are connected to the low-side switches Q4 to Q6, and then, a regeneration current flows through the parasitic diodes of the high-side switches Q1 to Q3, causing breakage of the switching elements Q1 to Q3.

Moreover, the timings for turning off the low-side switches Q4 to Q6 are set in the period during which the braking current flows to the motor 20 from the low-side switches Q4 to Q6 (in the forward (+) direction in FIG. 3) and the braking current in the forward direction decreases. This can shorten a period from when the low-side switches Q4 to Q6 are turned off to when the braking current becomes zero, thereby inhibiting heat generation in the parasitic diodes due to the flow of the braking current. Consequently, it is possible to inhibit temperature increase in the low-side switches Q4 to Q6.

Hereinafter, explanations are given with respect to a control process executed by the microcomputer included in the control circuit 50 to perform a function of the brake control unit 58 that carries out the three-phase to two-phase alternative brake control described above.

Figures 4A, 4B:
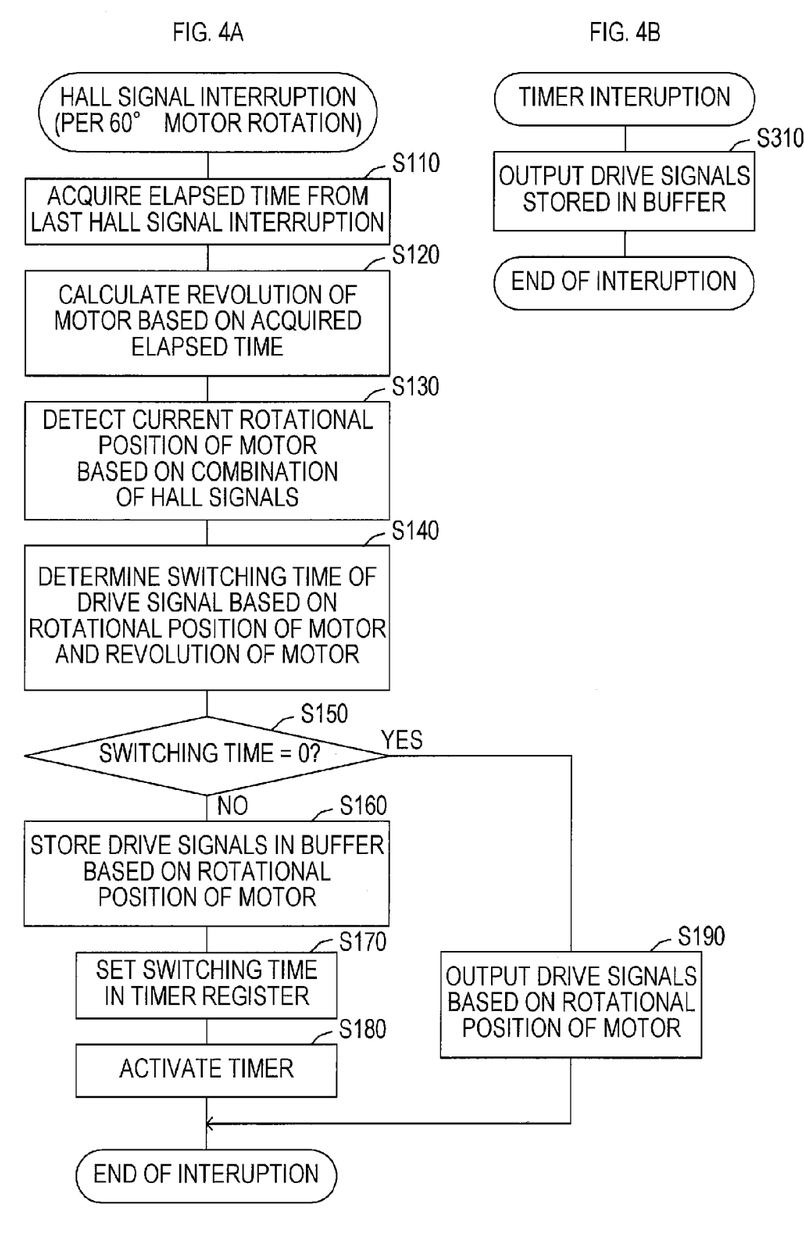
FIGS. 4A and 4B are flowcharts showing a control process executed to perform a function as a brake control unit in a control circuit.

This control process includes a Hall signal interruption process shown in FIG. 4A and a timer interruption process shown in FIG. 4B. The Hall signal interruption process is executed, in synchronization with an edge timing of the Hall signal, at each 60-degree rotation of the motor 20. The timer interruption process is executed as required in relation to the Hall signal interruption process.

In the Hall signal interruption process, first in S110 ("S" represents a step), an elapsed time from the last Hall signal interruption is acquired; and next, in S120, based on the acquired elapsed time, a revolution (i.e., rotational speed) of the motor 20 is calculated. These two steps correspond to functions of the rotor rotational speed calculating unit 54.

Next, in S130, based on a signal level of the Hall signal of each of the phases U, V, and W, a rotational position of the motor 20 (angle: 0 degree, 60 degrees, 120 degrees, . . . ) is detected.

In S140, a switching time of a switching element to be next turned on and off is determined. Specifically, based on a control map of the three-phase to two-phase alternative brake control stored in advance in a memory (e.g., ROM, etc.), the switching time of this switching element to be next turned on and off is obtained in relation to the rotational position of the motor 20 detected in S130, and then, the obtained switching time is corrected based on the revolution of the motor 20 calculated in S120.

Here, the reason why the switching time as a reference is corrected based on the revolution of the motor 20 as described above is that, braking force and braking current, both of which are necessary to apply a brake to the motor 20, change depending on the revolution of the motor 20.

That is to say, in the present embodiment, since timings for turning on and off the switching elements are corrected depending on the revolution of the motor 20, the braking current flowing to the motor 20 (therefore, braking force) can be optimally controlled.

In S150, it is determined whether the switching time determined in S140 is zero, in other words, whether, at this moment, the switching elements need to be immediately turned on and off.

If the switching time is zero, the process proceeds to S190. In S190, a drive signal pattern of each of the switching elements Q1 to Q6, the drive signal pattern corresponding to the current rotational position of the motor 20, is read from the control map of the three-phase to two-phase alternative brake control. In accordance with the read drive signal pattern, a drive signal is outputted to a gate of each of the switching elements Q1 to Q6. Then, the present Hall signal interruption process is terminated.

On the other hand, when it is determined in S150 that the switching time is not zero, the process proceeds to S160. In S160, a drive signal pattern of each of the switching elements Q1 to Q6 at a time after the switching element, the switching time of which has been determined in S140, has been turned on and off, is acquired from the aforementioned control map. Then, the acquired drive signal patter is stored in a buffer.

In the subsequent S170, the switching time determined in S140 is set in a timer register. In S180, the timer is activated to start timekeeping of the switching time. Then, the present Hall signal interruption process is terminated.

Here, when the timer starts the timekeeping in S180, timer interruption occurs after the switching time elapses. Therefore, in response to this timer interruption, the control circuit 50 executes a process of S310 and outputs the drive signals of the switching elements Q1 to Q6 set in the buffer in S160, to the corresponding gates of the switching elements Q1 to Q6.

Consequently, the drive signals shown in FIG. 3 are inputted to the low-side switches Q4 to Q6 in synchronization with the rotation of the motor 20, and the low-side switches Q4 to Q6 are turned on and off.

Although the one exemplary embodiment of the present disclosure was described above, the present disclosure is not limited to the above-described embodiment and can take various forms without departing from the spirit of the present disclosure.

For example, in the above-described embodiment, it is configured such that, unlike the conventional all-phase short-circuit brake, the period during which the low-side switches Q4 to Q6 of the phases U, V, and W are off are set in synchronization with the rotation of the motor 20, so as to reduce the braking current flowing via the low-side switches Q4 to Q6, thereby suppressing braking force.

However, it is not necessary that respective periods during which the low-side switches Q4 to Q6 are on or off coincide with one another in the phases U, V, and W. For example, as shown in FIG. 5, control patterns for turning on and off the low-side switches Q4 to Q6 may be differently set from one another among the phases U, V, and W.

Figure 5:
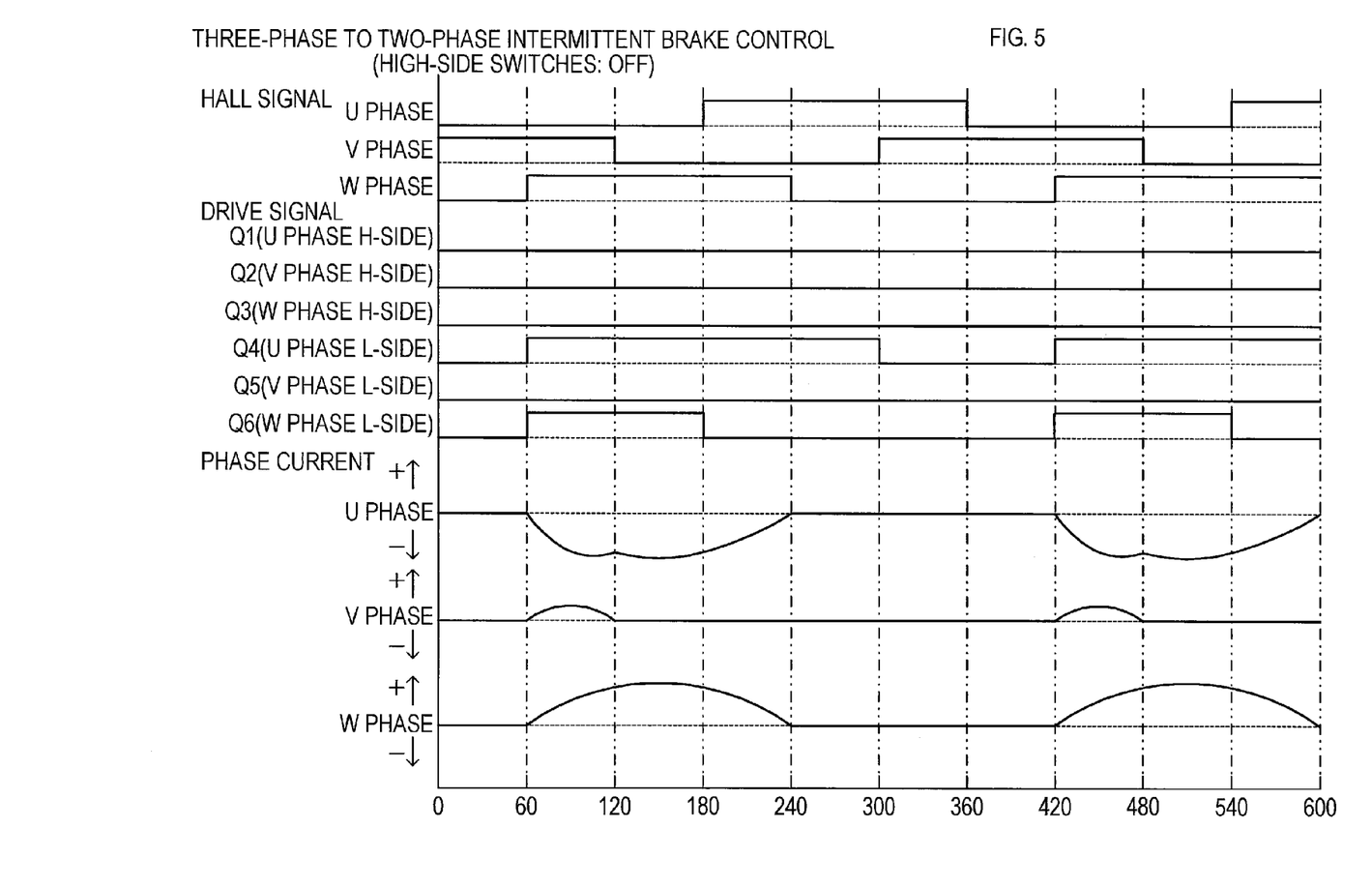
FIG. 5 is an explanatory view showing changes in Hall signals, drive signals, and phase current in a three-phase to two-phase intermittent brake control.

In a three-phase to two-phase intermittent brake control shown in FIG. 5, among the low-side switches Q4 to Q6, the low-side switches Q4 and Q6 of the phases U and W are periodically turned on and off at different control patterns from each other, while the low-side switch Q5 of the phase V is maintained to be off. Therefore, braking current intermittently flows to the motor 20 via the low-side switches Q4 and Q6, resulting in generation of braking force corresponding to the braking current.

Also in this three-phase to two-phase intermittent brake control, respective timing for turning off the low-side switches Q4 and Q6 are set, such that at the time when the low-side switches Q4 and Q6 are turned off from on, regeneration current is inhibited from flowing to the battery pack 16.

Specifically, in this brake control, the low-side switches Q4 and Q6 are simultaneously turned on, so that braking current flows from the low-side switch Q6 to the motor 20 and further to the low-side switch Q4 in sequence. Thereafter, the low-side switch Q6 is turned off before the current flowing direction is reversed. The turn-off timing of the low-side switch Q6 is set in a period during which the braking current flowing to the low-side switch Q6 in the forward direction decreases after once reaching the maximum.

For this reason, even if the low-side switch Q6 is turned off, the motor current continues to flow through the parasitic diode of the low-side switch Q6; consequently, it is possible to inhibit flow of the regeneration current to the battery pack 16. Moreover, it is possible to inhibit heat generation of the low-side switch Q6, by shortening the period during which the motor current flows through the parasitic diode of the low-side switch Q6.

The turn-off timing of the low-side switch Q4 is set at a time after the braking current stopped flowing in the forward direction through the parasitic diode of the low-side switch Q6 subsequent to the turn-off of the low-side switch Q6. This is because, when the low-side switch Q4 is turned off during interruption of the braking current by the low-side switch Q6, regeneration current is inhibited from flowing to the battery pack 16.

In the brake control of the above-described embodiment and the brake control shown in FIG. 5, turn-on and turn-off control of the low-side switches Q4 to Q6 is performed so as to cause braking current to flow to the motor 20 and generate braking force.

However, it is also possible to perform the brake control by turn-on and turn-off control of the high-side switches Q1 to Q3 while the low-side switches Q4 to Q6 are maintained to be off.

In this case, in order to inhibit flow of regeneration current after the high-side switches Q1 to Q3 are turned off, it is necessary to set timings with which motor current can continuously flow through the parasitic diodes of the high-side switches Q1 to Q3.

Therefore, when the high-side switches Q1 to Q3 are used for the brake control, the turn-off timings of the high-side switches Q1 to Q3 may be set such that the high-side switches Q1 to Q3 are turned off while the motor current flows from the motor 20 to any of the high-side switches Q1 to Q3 (i.e., flowing direction of the motor current is backward (−) direction).

Moreover, when only one group of a group of the low-side switches and a group of the high-side switches is used for the brake control, braking current flows to the parasitic diodes of the used switches. Accordingly, heat generation occurs only in the used switches, and the used switches are subject to deterioration.

Figure 6:
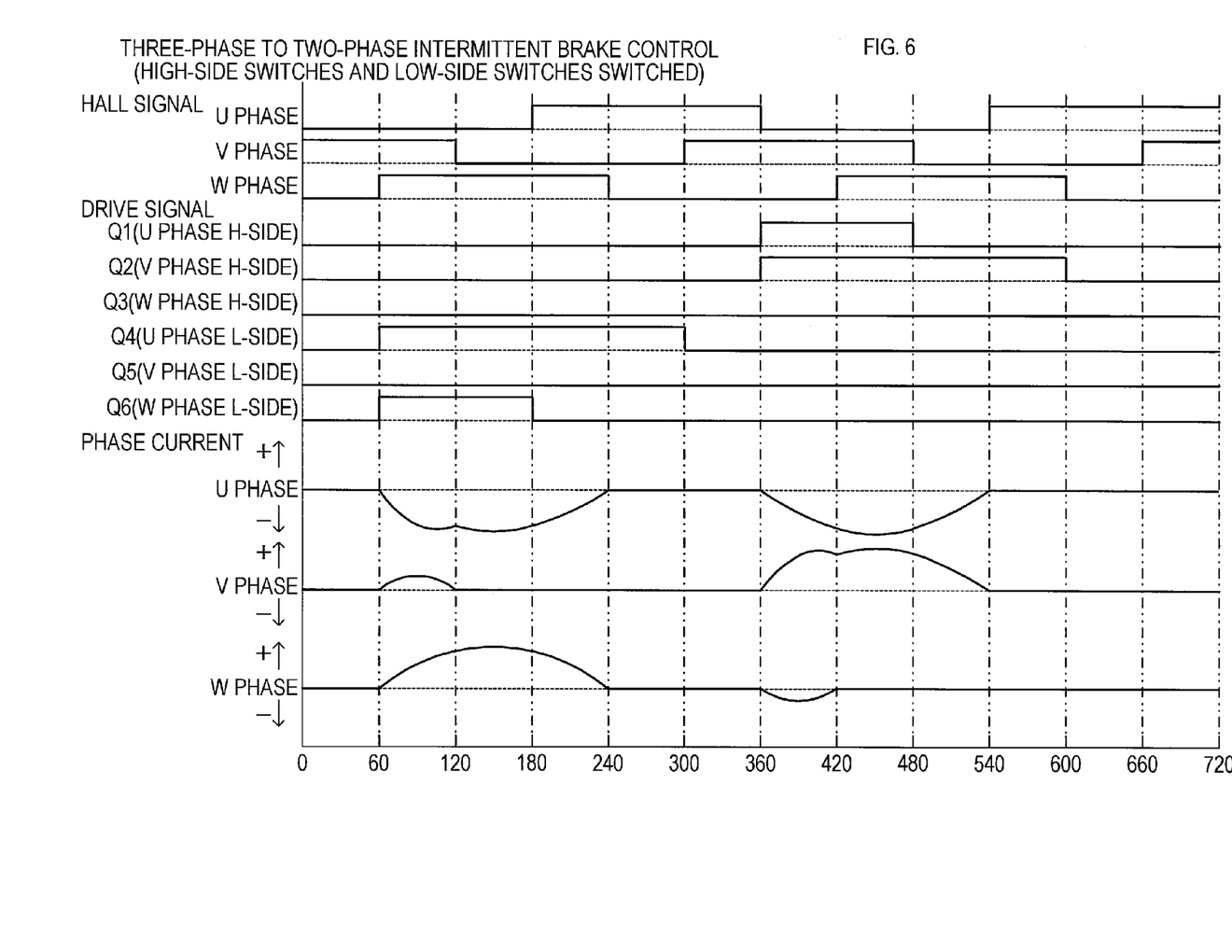
FIG. 6 is an explanatory view showing a variation of the three-phase to two-phase intermittent brake control shown in FIG. 5.

For this reason, as shown in FIG. 6, the group of the high-side switches Q1 to Q3 and the group of the low-side switches Q4 to Q6 may be alternately used in the brake control.

FIG. 6 shows waveforms in the brake control where the three-phase to two-phase intermittent brake control shown in FIG. 5 is performed by alternately using the group of the low-side switches Q4 and Q6 and the group of high-side switches Q1 and Q2, per rotation of the motor 20.

In this brake control, when the high-side switches Q1 and Q2 are used to cause braking current to flow, the high-side switches Q1 and Q2 are turned on at the same timing with each other, so that backward current flows to the high-side switch Q1 and forward current flows to the high-side switch Q2.

Moreover, an off-timing of the high-side switch Q1 is set at a time in a period during which the braking current, which is flowing in the backward direction to the high-side switch Q1, is decreasing. An off-timing of the high-side switch Q2 is set at a time after the braking current is completely interrupted by the high-side switch Q1.

As described above, in the brake control shown in FIG. 6 as well, it is possible to inhibit flow of regeneration current when the high-side switches Q1 and Q2 are turned from on to off.

In performing the brake control by using the high-side switches and the low-side switches alternately in the above-described manner, switches to be used may be changed per rotation of the motor 20 as shown in FIG. 6, or per a given number of rotations of the motor 20.

Figure 7A:
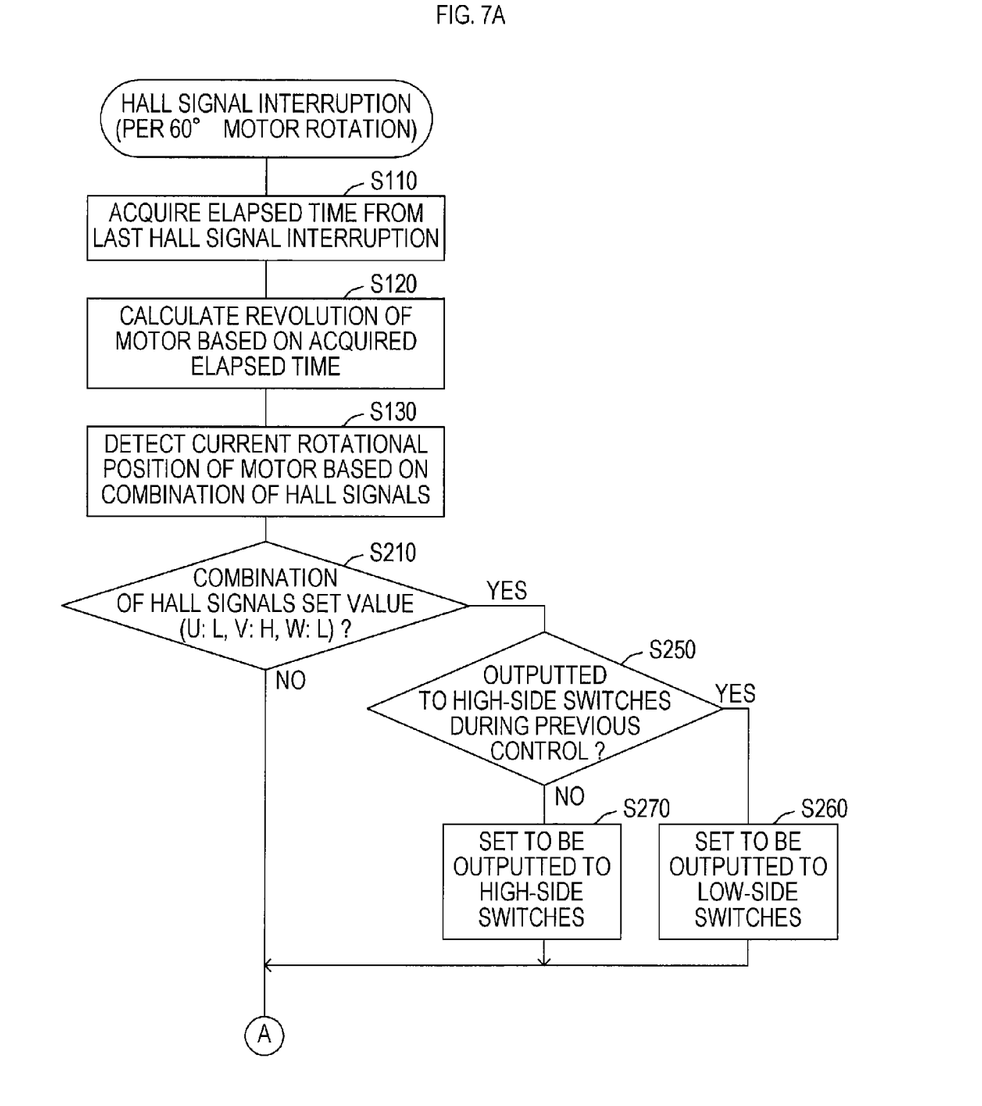
FIG. 7A is a flowchart showing part of a Hall signal interruption process executed to implement the three-phase to two-phase intermittent brake control shown in FIG. 6.
Figure 7B:
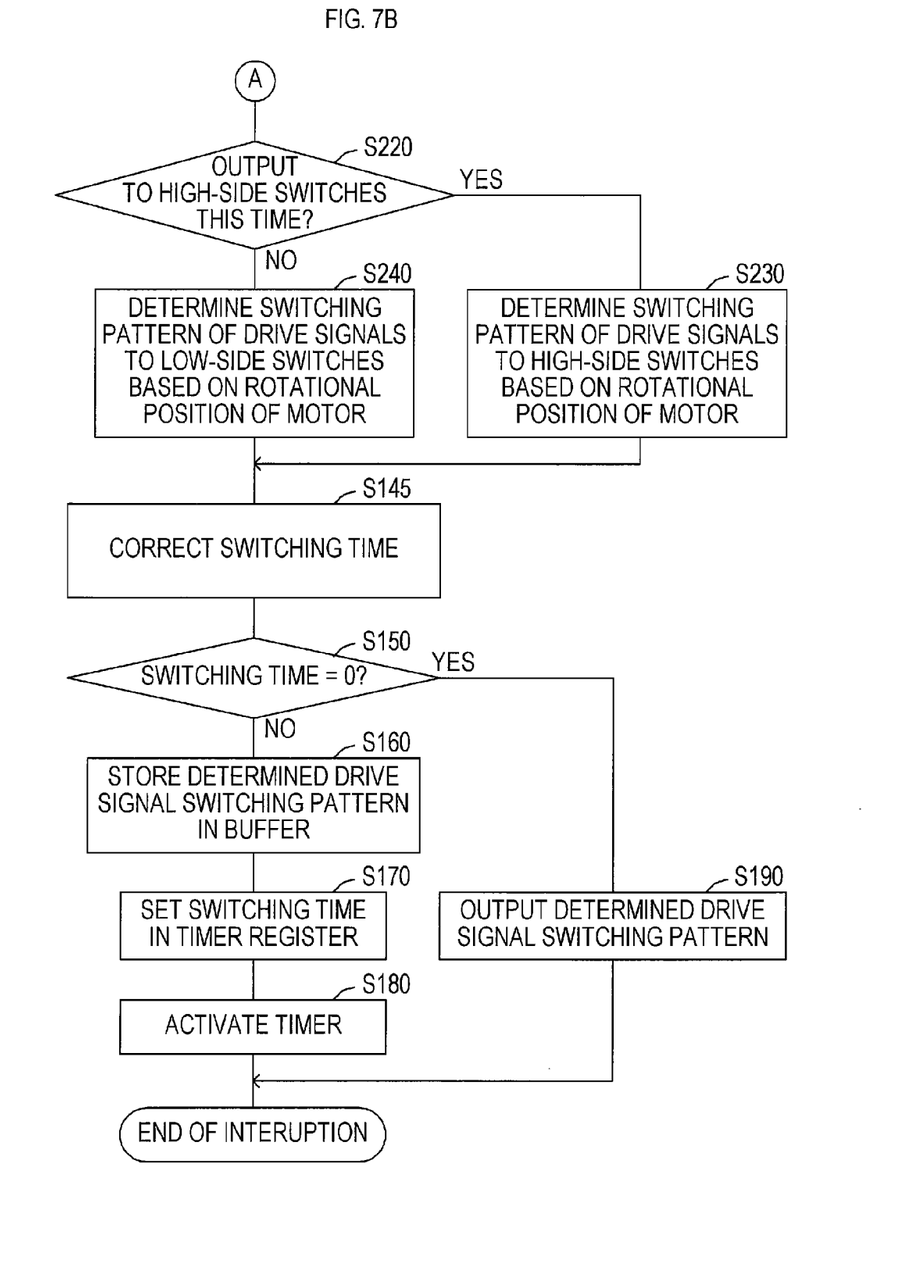
FIG. 7B is a flowchart showing the rest of the Hall signal interruption process executed to implement the three-phase to two-phase intermittent brake control shown in FIG. 6.

Furthermore, if the switches to be used are changed per rotation of the motor 20 as shown in FIG. 6, the control circuit 50 may perform the Hall signal interruption process shown in FIGS. 7A and 7B.

Specifically, in the Hall signal interruption process shown in FIGS. 7A and 7B, after the processes of S110 to S130 are executed in the same manner as in the Hall signal interruption process in FIG. 4A, it is determined in S210 whether a combination of Hall signals has a set value, which has been set in advance (specifically, Hall signals of the phases U and W are low level, and a Hall signal of the phase V is high level).

Here, the process of S210 is to determine, based on the combination of Hall signals, whether the rotational position of the motor 20 is a reference position (rotation angle in FIG. 6: position of 0 degree).

When it is determined in S210 that the combination of Hall signals has the set value and therefore, the motor 20 is at the reference position, the process proceeds to S250 to determine whether, during the previous brake control, a drive signal has been outputted to the high-side switches (i.e., whether the high-side switches were used in the brake control).

When it is determined in S250 that the high-side switches were used in the previous brake control, the process proceeds to S260. In S260, in order to use the low-side switches in the subsequent brake control, the drive signal is set to be outputted to the low-side switches, and then the process proceeds to S220.

On the other hand, when it is determined in S250 that the low-side switches were used in the previous brake control, the process proceeds to S270. In S270, in order to use the high-side switches in the subsequent brake control, the drive signal is set to be outputted to the high-side switches, and then the process proceeds to S220.

In S220, it is determined whether the drive signal is set to be outputted to the high-side switches in the current brake control; if the drive signal is set to be outputted to the high-side switches, the process proceeds to S230; if not, the process proceeds to S240.

In S230, by using a control map for performing the brake control with the high-side switches, a switching pattern of a switching element to be next turned on and off is acquired based on the rotational position of the motor 20 detected in S130.

In S240, by using a control map for performing the brake control with the low-side switches, a switching pattern of a switching element to be next turned on and off is acquired based on the rotational position of the motor 20 detected in S130.

In the subsequent S145, a switching time is corrected based on the revolution of the motor 20 calculated in S120, to thereby determine the switching time of the switching element to be next turned on and off.

Next in S150, it is determined whether the switching time determined in S145 is zero, in other words, whether, at this moment, the switching element needs to be immediately turned on and off.

If the switching time is zero, the process proceeds to S190 to output the drive signal to a gate of each of the switching elements Q1-Q6, in accordance with the switching pattern determined in S230 or S240. Then, the present Hall signal interruption process is terminated.

On the other hand, if it is determined in S150 that the switching time is not zero, the process proceeds to S160. In S160, the switching pattern determined in S230 or S240 after the switching element, the switching time of which was determined in S145, has been turned on and off, is stored in a buffer.

In the subsequent S170, the switching time determined in S145 is set in a timer register. In S180, the timer is activated to start timekeeping of the switching time, and then the present Hall signal interruption process is terminated.

When the timer starts the timekeeping in S180, timer interruption occurs after the switching time elapses.

For this reason, in response to the timer interruption, the control circuit 50 executes a process of S310 shown in FIG. 4B and outputs, to the corresponding gates of the switching elements Q1 to Q6, the drive signals of the switching elements Q1 to Q6 set in the buffer in S160.

With respect to the Hall signal interruption process in FIG. 4A, FIG. 7A, and FIG. 7B, it is explained that a time of switching the drive signal, i.e., a switching timing of the switching element on and off, is determined such that a timing used as a reference is acquired from the control map and corrected based on the revolution of the motor.

However, this correction of the switching timing is not necessarily required to be carried out. The switching timing acquired from the control map may be used as it is. Moreover, when the switching timing is corrected to control braking force generated in the motor 20 with higher accuracy, it may be possible to use, in addition to the revolution of the motor, a parameter affecting generation of braking force, e.g., temperature, voltage of direct current source, and so on.

Moreover, a braking command from the user varies depending on an operated amount of the trigger switch 12 serving as an operation unit. Thus, the switching timing may be corrected by using the operated amount of the trigger switch 12. In addition, the switching timing may be corrected by using one of or a combination of such parameters.

In the above-described embodiment, the switching timing of the switching element on and off is set based on detection signals (Hall signals) from the Hall sensors 21 to 23 that detect the rotational position of the motor 20; however, this switching timing may be set by using a detection signal from another rotation sensor for rotational position detection, e.g., an encoder, etc.

Moreover, although it is explained in the above embodiment that the control circuit 50 carries out the three-phase to two-phase alternative brake control, the control circuit 50 may store other control maps, e.g., a three-phase to two-phase intermittent brake control, etc., in the memory (ROM) so as to switch the brake control depending on a condition of the motor 20 (in other words, depending on braking force to be generated).

This configuration allows a more optimal control of braking force generated when the motor 20 is stopped rotating or decelerated.

Furthermore, in the above embodiment, each of the switching elements Q1 to Q6 forming the switching circuit 32 is configured as an N-channel MOSFET including parasitic diodes. However, if the parasitic diodes do not exist in the switching elements Q1 to Q6, diodes may be connected in parallel with the switching elements Q1 to Q6, respectively.

Electric power tools to which the present disclosure can be applied includes, not only general electric power tools, such as drill drivers, impact drives, grinders, etc., but also electric power tools for gardening, such as brush cutters for cutting grass and bushes, and chain saws capable of cutting an object without sliding the tool body thereof forward and backward. That is to say, the present invention can be applied to any electric power tool that comprises a three-phase brushless motor as a power source and that is capable of performing a specified operation by rotation of the motor.

Moreover, the present disclosure can be applied to, in addition to an electric power tool provided with a battery as a direct current power source, an electric power tool that operates upon receipt of a power supply from an external direct-current power source, such as an AC adaptor, etc., as well as an electric power tool that operates upon receipt of a power supply from an alternating-current power source, such as a commercial power source, etc.

What is claimed is:

1. A braking apparatus for an electric power tool that causes a three-phase brushless motor provided in the electric power tool and having three terminals to generate a braking force, the braking apparatus comprising:
   a switching circuit comprising six switching elements, the six switching elements comprising:
      a first set of three switching elements forming a high-side switch group provided on a positive side current conduction path that connects the three terminals with a positive electrode side of a direct current power source so as to connect or disconnect the positive side current conduction path; and
      a second set of three switching elements forming a low-side switch group provided on a negative side current conduction path that connects the three terminals with a negative electrode side of the direct current power source so as to connect or disconnect the negative side current conduction path, and
   each of the six switching elements including a diode connected in parallel thereto; and
   a brake control unit configured such that during rotation of the three-phase brushless motor, upon receiving an input of one of a stop command and a deceleration command of the electric power tool, the brake control unit controls an on/off state of the three switching elements of the high-side switch group and an on/off state of the three switching elements of the low-side switch group to cause a braking current to flow to the three-phase brushless motor, thereby generating the braking force, and
   wherein the brake control unit is further configured to switch any one selected switching element of the three switching elements forming one selected switch group of the high-side switch group and the low-side switch group to the off state from the on state at a timing at which the braking current flows through the diode connected in parallel to the selected switching element upon turn-off of the selected switching element.

2. The braking apparatus according to claim 1,
   wherein the selected switch group is the low-side switch group, and
   wherein the brake control unit is configured to switch the selected switching element from the on state to the off state when the braking current is flowing to the three-phase brushless motor from the low-side switch group.

3. The braking apparatus according to claim 1,
   wherein the selected switch group is the high-side switch group, and
   wherein the brake control unit is configured to switch the selected switching element from the on state to the off state when the braking current is flowing to the high-side switch group from the three-phase brushless motor.

4. The braking apparatus according to claim 1,
   wherein the brake control unit is configured to switch the selected switching element from the on state to the off state when the braking current flowing through the selected switching element decreases.

5. The braking apparatus according to claim 1, further comprising a rotational position detection unit that is configured to detect a rotational position of the three-phase brushless motor at every given angle of rotation of the three-phase brushless motor, and
   wherein the brake control unit is configured to switch the selected switching element from the on state to the off state based on the rotational position detected by the rotational position detection unit.

6. The braking apparatus according to claim 5,
   wherein the brake control unit is configured to switch the selected switching element from the on state to the off state, after an elapse of a given time period subsequent to detection of a specified rotational position by the rotational position detection unit.

7. The braking apparatus according to claim 5,
   wherein the brake control unit is configured to switch the selected switching element from the on state to the off state based on a drive condition of the three-phase brushless motor.

8. The braking apparatus according to claim 7,
   wherein the brake control unit is configured to:
      detect, as the drive condition of the three-phase brushless motor, at least one of a revolution of the three-phase brushless motor, a temperature of the three-phase brushless motor, a voltage of the direct current power source, and an operated amount of an operation unit that instructs driving of the electric power tool; and switch the selected switching element from the on state to the off state based on the drive condition detected.

9. The braking apparatus according to claim 5, wherein the brake control unit is configured to switch the selected switching element from the off state to the on state based on the rotational position detected by the rotational position detection unit.

10. The braking apparatus according to claim 9, wherein the brake control unit is configured to switch the selected switching element from the off state to the on state, after an elapse of a given time period subsequent to detection of a specified rotational position by the rotational position detection unit.

11. The braking apparatus according to claim 5, wherein the brake control unit is configured to switch the selected switching element from the off state to the on state based on a drive condition of the three-phase brushless motor.

12. The braking apparatus according to claim 11, wherein the brake control unit is configured to:
   detect, as the drive condition of the three-phase brushless motor, at least one of a revolution of the three-phase brushless motor, a temperature of the three-phase brushless motor, a voltage of the direct current power source, and an operated amount of an operation unit that instructs driving of the electric power tool; and
   switch the selected switching element from the off state to the on state based on the drive condition detected.

13. The braking apparatus according to claim 1, wherein the brake control unit is configured to simultaneously make the three switching elements of the selected switch group be in off state for at least a given period of time.

14. The braking apparatus according to claim 13, wherein the brake control unit is configured to alternately perform a current conduction control and a current non-conduction control,
   the current conduction control being configured to selectively make any two elements of the three switching elements of the selected switch group be in on state to cause the braking current to flow to the three-phase brushless motor; and
   the current non-conduction control being configured to simultaneously make the three switching elements of the selected switch group be in off state.

15. The braking apparatus according to claim 1, wherein the brake control unit is configured to simultaneously make the three switching elements of the selected switch group be in on state for at least a given period of time.

16. The braking apparatus according to claim 1, wherein the brake control unit is configured to alternately use the high-side switch group and the low-side switch group as the selected switch group.

* * * * *